United States Patent [19]

Dorn

[11] 4,275,435

[45] Jun. 23, 1981

[54] TROUBLE LIGHT

[76] Inventor: Harry M. Dorn, 2055 Arch Creek Dr., N. Miami, Fla. 33161

[21] Appl. No.: 66,707

[22] Filed: Aug. 15, 1979

[51] Int. Cl.[3] ............................................... B60Q 1/00

[52] U.S. Cl. .................................... 362/368; 362/376; 362/378; 362/396

[58] Field of Search ................ 362/368, 378, 396, 376

[56] References Cited

U.S. PATENT DOCUMENTS 4,141,062 2/1979 Trueblood .......................... 362/378

*Primary Examiner*—Stephen J. Lechert, Jr.

*Attorney, Agent, or Firm*—Lawrence I. Field

[57] ABSTRACT

A trouble light comprising a reflector, a cage and a handle all made of synthetic resin polymer, in which at least a part of the handle and either the reflector or the cage are molded as an integral unit.

9 Claims, 10 Drawing Figures

TROUBLE LIGHT

This invention relates to a trouble light or drop light as it is sometimes styled. More particularly it relates to a trouble light which consists of a handle and light guard molded as an integral unit.

For many years trouble light guards have been fabricated from metal or wire and attached to handles made of electrically insulating material by means of collars or bands or other fastening means. Patents showing such constructions include the following United States Patents:

| | | |
|---|---|---|
| Ribble | 2,172,223 | issued September 5, 1939; |
| Pierce | 2,225,391 | issued December 17, 1940; |
| Popp | 2,258,032 | issued October 7, 1941; |
| Lebeda | 2,291,907 | issued August 4, 1942; |
| Kollath | 2,549,487 | issued April 17, 1951; |
| Kevorkian | 2,686,254 | issued August 10, 1954; |
| Weight | 2,735,930 | issued February 21, 1956; |
| Moreschini | 3,755,668 | issued August 28, 1973; |
| Ross | 4,128,226 | issued December 8, 1978; |

and many others of similar constructions.

Recently synthetic resin has been used as the material for the reflector and cage portions of the trouble light instead of the metal cages of the prior art. This development is illustrated in the following:

| | | |
|---|---|---|
| Broder | 3,119,568 | issued January 28, 1964; |
| Dorn | 3,935,560 | issued January 27, 1976; |
| Dorn | D 240,157 | issued June 1, 1976; |
| Trueblood | 4,141,062 | issued February 20, 1979. |

In every instance of which I am aware, the cage and reflector have been produced as a unit separate from the handle. Of course when the handle was made of rubber or wood or other electrically insulating material and the cage and reflector were made of metal, this was to be expected.

The present invention is directed to a one-piece trouble light in which at least a portion of the handle and at least a portion of the light guard are molded together as a unitary structure. As a consequence assembly of the light guard is greatly simplified and the guard and handle will not become detached from one another. The resulting structure is safer than prior art devices since it consists entirely of electrically non-conductive material and in addition is is less expensive to manufacture.

The invention will be readily understood from the description which follows, taken in conjunction with the drawings which show preferred embodiments of the invention and in which.

Figure 1:
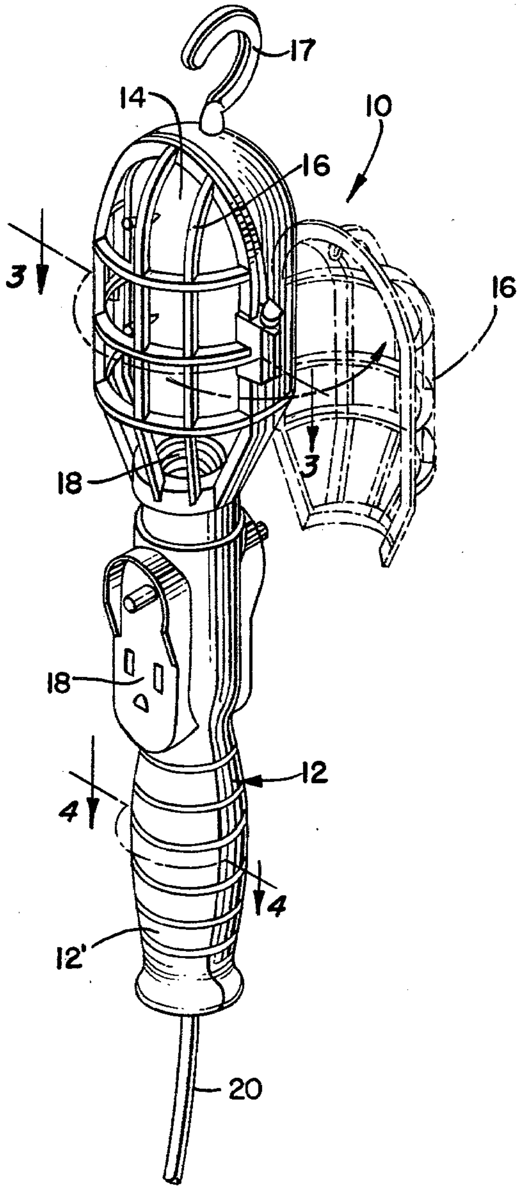
FIG. 1 is a view in perspective of a preferred form of trouble light.
Figure 2:
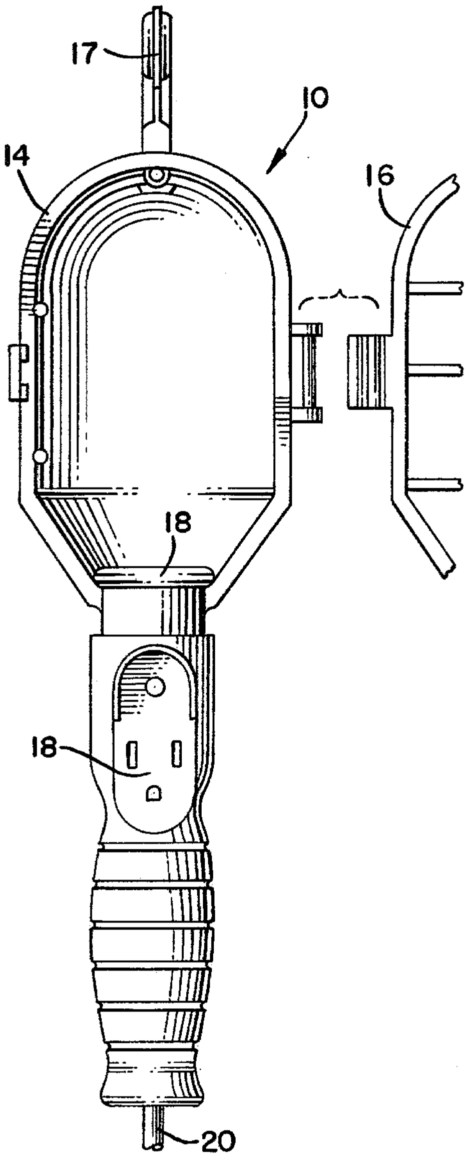
FIG. 2 is a perspective front plan view of the trouble light of FIG. 1.
Figure 3:
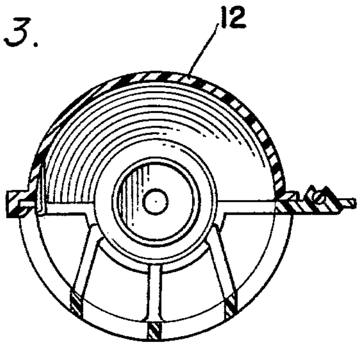
FIG. 3 is a view partly in section taken on plane 3—3 of FIG. 1.
Figure 4:
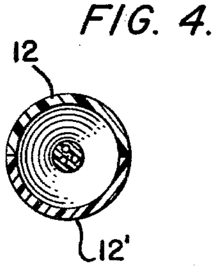
FIG. 4 is a section taken on plane 4—4 of FIG. 1.

As shown in the several embodiments the improved trouble light 10 comprises a handle 12, reflector 14, and cage 16. An electrical socket 18 may be molded in the handle and suitable hardware for connecting the handle to a source of electricity through a lead wire 20 is installed in the handle.

In the embodiment shown in FIGS. 1-4, one half of the handle 12 is molded integrally with the reflector 14 and the other half of the handle 12' and cage 16 are molded separately. The trouble light guard is assembled by inserting the appropriate hardware into the central recess of the handle and then securing the two halves together, by screws or other fasteners (not shown), hinges, or adhesive. Of course instead of the reflector 14, the handle could be molded integral with cage 16 but this is less sturdy and less preferred. Further, when a socket 18 is molded in the handle, the same may be molded around suitable hardware as inserts in the mold.

The reflector 14 and cage 16 and hook 17 are preferably constructed as in my U.S. Pat. No. 3,935,560 issued Jan. 27, 1976 and are assembled in the usual way.

Figure 5:
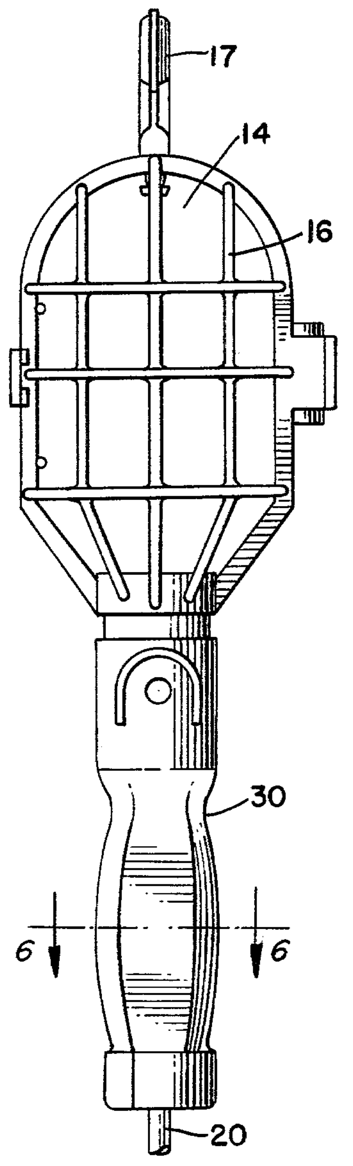
FIG. 5 is a view similar to FIG. 1 showing another handle configuration.
Figure 7:
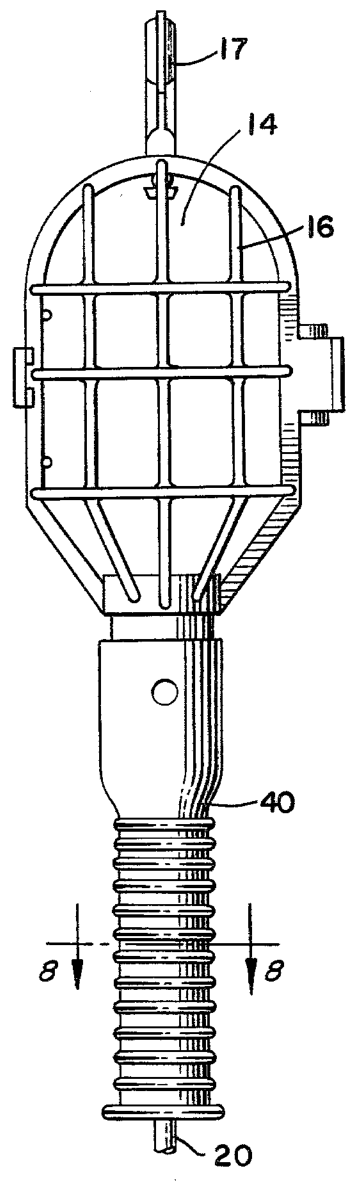
FIG. 7 is another view similar to FIG. 1 of a further embodiment.
Figure 9:
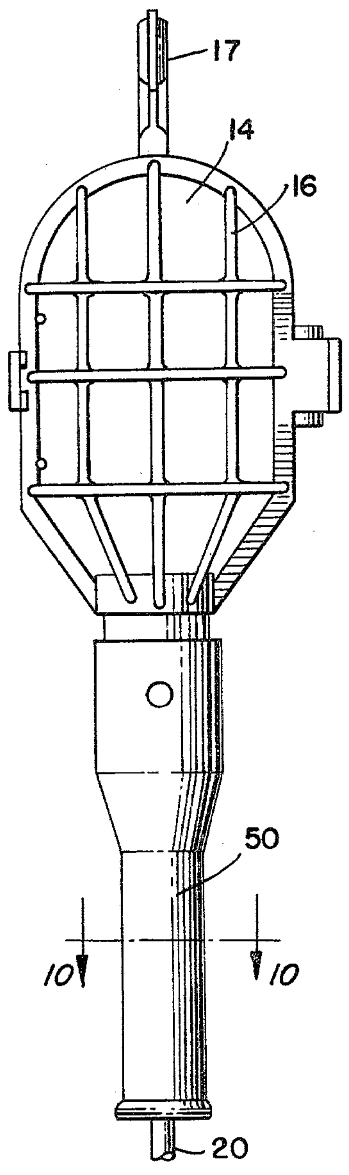
FIG. 9 shows another embodiment.
Figure 6:
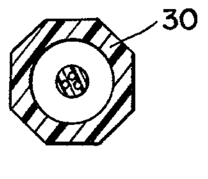
FIG. 6 is a section on plane 6—6 of FIG. 5.
Figure 8:
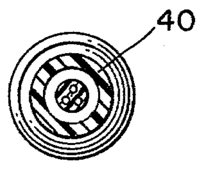
FIG. 8 is a section on plane 8—8 of FIG. 7.
Figure 10:
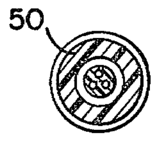
FIG. 10 is a section taken on plane 10—10 of FIG. 9.

FIGS. 5, 7 and 9 show other handle configurations 30, 40 and 50 respectively which provide other gripping means for the user. Each of these may be modified by providing a socket as in the embodiment of FIG. 1, but when they do not contain a socket connection 18, the both halves of the handle are molded as a unit with the reflector and define a central passage for lead wire 20.

In the present invention, the specific configurations of the guard and of the handle are not critical provided that they are such that the two parts may be molded as a single member.

Preferred configurations for the reflector, cage and hook are shown in my issued U.S. Pat. No. 3,935,560 but other cage, reflector, hook constructions may be used provided that the reflector or cage is molded integral with the handle. The cage may be connected to the reflector by the hinge shown in my patent, or by any other hinge design including a living hinge as shown in U.S. Pat. Nos. Broder 3,119,568 or Trueblood 4,141,062, thus making the cage, reflector and handle a single piece. Similarly the hook may be integral with the reflector or it may be snap-fitted into a recess in the reflector.

As indicated above, the handle may be of any suitable configuration, and may be either in two halves or as a single molded piece. It may include a molded socket, or a recess to receive a socket, and may include a fitting to receive an electrical plug, or merely have a hollow handle through which a light cord may pass to a connection to the socket.

Having now described preferred embodiments of my invention, it is not intended that it be limited except as may be required by the appended claims.

I claim:

1. A trouble light guard comprising:
   a handle portion and a reflector portion integral with said handle portion and molded as a single piece from a synthetic resin polymer.

2. The trouble light guard of claim 1 wherein the handle portion includes means to receive a socket for a light bulb.

3. The trouble light guard of claim 1 wherein the handle includes an axial bore adapted to receive a light cord.

4. The trouble light guard of claim 1 wherein there is an electrical socket molded on said handle portion to receive the prongs of an electrical plug.

5. The trouble light guard of claim 1 wherein said trouble light guard includes a cage portion and a reflector portion attached to one another by a hinge means.

6. The trouble light guard of claim 5 including a hook attached to said reflector position.

7. The trouble light guard of claim 1 wherein the handle consits of two halves molded of synthetic resin polymer and secured to each other by suitable fastening means.

8. A trouble light guard comprising:
a handle portion and a reflector portion molded integrally from a synthetic resin polymer.

9. The trouble light guard of claim 8 including in addition a cage assembled to said reflector.

* * * * *